(12) United States Patent
Filipovitz et al.

(10) Patent No.: US 12,030,546 B2
(45) Date of Patent: Jul. 9, 2024

(54) PROTECTIVE CANOPY COVER

(71) Applicant: FLIPFORT LLC, Shaker Heights, OH (US)

(72) Inventors: Sarah Filipovitz, Hudson, OH (US); Ellen Velez, Shaker Heights, OH (US)

(73) Assignee: FLIPFORT LLC, Shaker Heights, OH (US)

( * ) Notice: Subject to any disclaimer, the term of this patent is extended or adjusted under 35 U.S.C. 154(b) by 447 days.

(21) Appl. No.: 17/334,138

(22) Filed: May 28, 2021

(65) Prior Publication Data

US 2021/0370999 A1    Dec. 2, 2021

Related U.S. Application Data

(60) Provisional application No. 63/031,998, filed on May 29, 2020.

(51) Int. Cl.
*A47C 7/66* (2006.01)
*B60J 1/20* (2006.01)
*B60N 3/00* (2006.01)
*B62B 9/14* (2006.01)

(52) U.S. Cl.
CPC ............ *B62B 9/142* (2013.01); *B60J 1/2011* (2013.01); *A47C 7/66* (2013.01); *A47C 7/666* (2018.08)

(58) Field of Classification Search
CPC .......... A47C 7/66; A47C 7/666; B60J 1/2011; B62B 9/142
USPC ............ 297/184.11, 184.13, 188.06, 228.12
See application file for complete search history.

(56) References Cited

U.S. PATENT DOCUMENTS

| | | | |
|---|---|---|---|
| 4,533,170 A | 8/1985 | Banks et al. | |
| 4,583,779 A * | 4/1986 | Myers | B60N 2/6009 297/184.13 X |
| 4,784,426 A * | 11/1988 | Mannisto-Iches | B60J 1/2011 297/184.13 X |
| 5,028,472 A * | 7/1991 | Gray | B60N 2/5833 297/228.12 X |
| 5,188,421 A * | 2/1993 | Arseneault | B60N 2/6036 297/188.06 X |
| 5,275,463 A * | 1/1994 | Rocha | A47C 1/14 297/228.12 X |
| 5,605,374 A * | 2/1997 | Perry | A47C 31/11 297/228.12 X |
| 5,730,490 A * | 3/1998 | Mortenson | B60N 2/6063 297/184.13 |
| 5,878,672 A * | 3/1999 | Ostermann | B60N 3/004 297/188.06 |
| 6,006,462 A * | 12/1999 | Lackomar | B60R 7/043 297/188.06 X |
| 6,056,355 A * | 5/2000 | Klassen | B60N 2/6063 297/184.13 |

(Continued)

FOREIGN PATENT DOCUMENTS

GB    2246547 A * 2/1992 ............. A47D 15/00

*Primary Examiner* — Rodney B White
(74) *Attorney, Agent, or Firm* — Hudak, Shunk & Farine Co. LPA

(57) ABSTRACT

A protective cover for use in connection with seated persons or pets in a moving conveyance protects the seated person from the effects of environmental elements, such as sun, rain and wind, motion effects, noise, interaction with other people and airborne contaminants, while providing a calming and restful environment for rest or sleep. The protective cover may incorporate antimicrobial treatments or materials to reduce organic load on the exposed side of the cover and the number of washings.

2 Claims, 7 Drawing Sheets

(56) References Cited

U.S. PATENT DOCUMENTS

| | | | | |
|---|---|---|---|---|
| 6,182,931 B1* | 2/2001 | Richard | B60N 2/6009 | 248/102 |
| 6,209,953 B1* | 4/2001 | Mackay | B60N 2/6009 | 297/184.13 X |
| 6,481,791 B1* | 11/2002 | Facchini | A47D 13/02 | 297/184.13 X |
| 7,083,228 B1* | 8/2006 | Al Sawan | B60N 2/2854 | 297/184.13 |
| 7,284,790 B1* | 10/2007 | Brewer | A47D 13/027 | 297/184.13 X |
| 7,530,635 B2* | 5/2009 | Schramek-Flye | B60N 2/2833 | 297/219.12 X |
| 8,550,548 B2* | 10/2013 | Gibbons | A47D 13/027 | 297/184.13 |
| 9,079,521 B1 | 7/2015 | Bowe | | |
| 10,800,532 B2* | 10/2020 | Hall, Jr. | B60N 2/90 | |
| 11,708,015 B1* | 7/2023 | Willis | B60N 2/6009 | 297/184.11 |
| 2002/0125747 A1* | 9/2002 | Drost | A41B 13/00 | 297/184.13 |
| 2003/0193221 A1* | 10/2003 | Hoey-Slocombe | A47G 9/068 | 297/184.13 |
| 2004/0075309 A1* | 4/2004 | Samaha | A47C 7/66 | 297/184.11 |
| 2006/0284456 A1* | 12/2006 | Compton | B62B 9/142 | 297/184.13 |
| 2010/0038939 A1* | 2/2010 | Kim | A47D 13/027 | 297/184.13 |
| 2013/0057032 A1* | 3/2013 | Turnage | A47D 15/00 | 297/184.13 |
| 2013/0292973 A1* | 11/2013 | Loaiza | A47D 13/027 | 297/184.13 X |
| 2014/0021751 A1* | 1/2014 | Lang | A47C 7/66 | 297/184.13 |
| 2014/0319886 A1* | 10/2014 | Coffman | A47D 15/00 | 297/184.13 X |
| 2015/0196126 A1* | 7/2015 | Bowe | B62B 9/142 | 297/184.13 X |

\* cited by examiner

FIG. 8
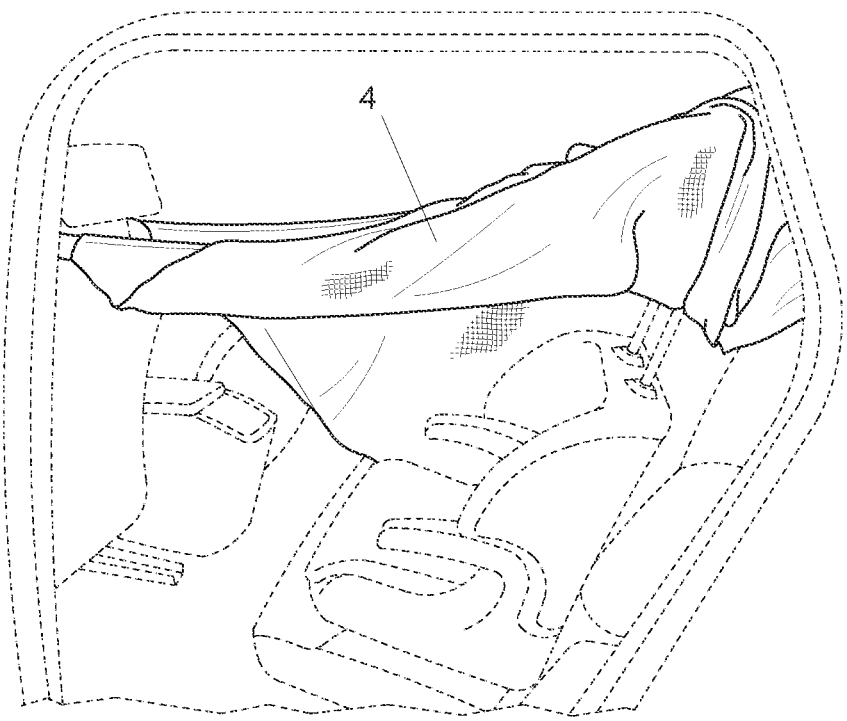
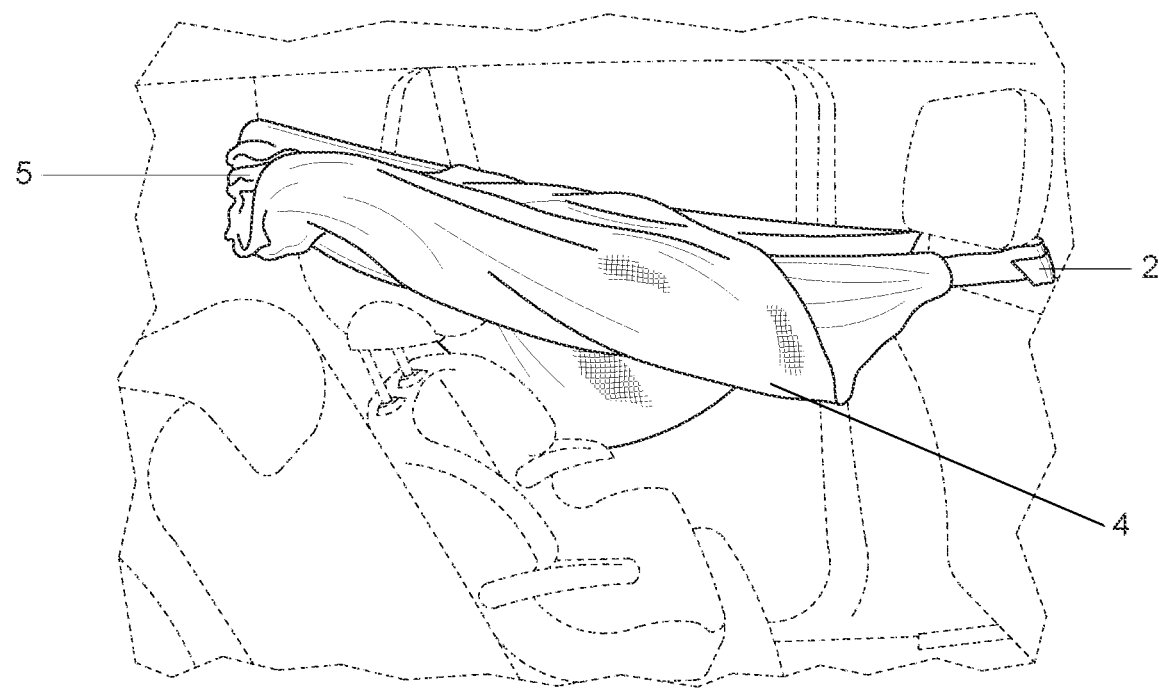
FIG. 9

PROTECTIVE CANOPY COVER

FIELD OF THE INVENTION

The invention is directed to a canopy-like cover or shield designed to be used as a protective cover for seated persons or pets in a variety of moving conveyances, including without limitation in car, train, boat and airplanes, pushchairs, carriages, buggies, carts and strollers, pet baskets or pet seats. The inventive protective cover is designed to attach to support structures over and around a seat in a moving conveyance and protects the person or pet from environmental elements, such as sun, rain and wind, noise, the effects of motion when riding in a car, and/or acts as a barrier or shield from other people and airborne contaminants when seated in a moving means of transportation (conveyance). The invention is particularly useful for travelers of all ages and parents of young children, when traveling by air, car, rail, boat or other moving conveyances, to provide a space that is safe and shielded for the user to sleep or rest.

BACKGROUND OF THE INVENTION

Travelers all over the world often have difficulty resting on moving transportation, and many suffer from the effects of motion sickness. Recently, the Covid pandemic has also caused concerns for travelers who need or want to travel but believe that they have minimal means of protection while on planes and trains. In addition to face masks, face shields and gloves, many travelers wear clothing to cover and protect exposed parts of the body and remove the clothing upon arriving at their destination.

Parents traveling with children by air, train, or car, or using car seats, pushchairs, strollers, or other moving carriers have few options available to them to minimize the stress of travel for children and young adults, minimize motion sickness, or block the effects of sunlight allowing the child to sleep or sit restfully while moving. In addition, parents have increased concerns in crowded environments that the child may be exposed to viruses or other airborne contaminants.

Products for blocking sun in cars are available and primarily comprise a sunshade that is attached to the window. These shades do not darken a space completely; they only tint the sun taking the glare out of the adult or child's eyes, similar to the effects of sunglasses. There are no protective canopy-, cover-, or shield-like products known to be effective for sensory reduction while riding in a moving vehicle or that protect a person from environmental contaminants. There are sensory "tents" that are used for children in the house or school setting, but none exist for use in cars.

Protective covers for child carrying devices are known in the art. One such cover is disclosed by U.S. Pat. No. 4,533,170, which is directed to a self-supporting frame for cover used on a stroller or similar infant conveyance, wherein the frame is flexed into a deformed self-supporting configuration when installed. Another example is U.S. Pat. No. 8,550,548, which is directed to a stowable covering that fits about a child seat to cover fully or partially an infant or child placed therein. The covering is made of flexible fabric that conforms to the shape of the stroller seat or may include ribs or other supports to define the shape of the covering. Yet another example is disclosed in U.S. Pat. No. 9,079,521, which is directed to a protective cover for a child or other occupant that is fitted around a carrying device such as a stroller seat or child/baby seat. Light weights may be attached to the cover to prevent it from lifting or blowing around. None of the aforenoted covers are useful for attaching inside a car over a carrying device such as a car seat or pet seat. They are also not useful for adults or older children. None are suitable or designed for use in other moving transport.

Currently, there are products that block the rain and sun and cover a stroller, but they are a plastic or mesh material and do not have the fastening mechanisms that allow them to be used in the car, train or airplane seating. They are also of different shapes, some of which may require a supportive frame. Examples include the Stokke® XPLORY® stroller rain cover, Uppababy® Rain shield, Phil and Teds Smart Buggy sun cover, all of which have a similar function, but cannot be used on all strollers or used in cars, trains or airplanes.

There remains a need for personal protective covers for adults, children and pets, when riding in a moving conveyance, such as a car, whether in a car or booster seat, seated on the rear passenger seat or in a pet basket or carrier, pushchair, buggy, stroller, carriage, train, or airplane. The personal protective cover should be large enough to cover a seated adult or child and have attachment means that allow the cover to be attached to a car, train or airplane seat, a pushchair, buggy, stroller, or carriage in such a manner that it does not have to be removed from the seat when arising or when there is a need to communicate with others or when attending to or removing a young child or pet. Such covers should be: i) easy to use and have a wide variety of sizes, ii) easy to attach and remove from a car, train or plane seat, or a pushchair, stroller, car seat, carriage, buggy or cart, iii) formed from breathable and water resistant fabric that minimizes environmental exposure, iv) configured to allow for quick access to a younger child or pet, v) configured to provide ways to interact fully with others, or the child or pet while still realizing the benefits of the cover when seated, and vi) easy to carry and transport when not in use. Optionally, the protective cover fabric may be treated, coated, or otherwise incorporate antimicrobial compositions or fibers as an additional protective measure against airborne contaminants, such as microbes, dirt, pollen, or other organic matter that may build up as an organic load on the exterior of the cover. Antimicrobial treatments, fabrics or materials may reduce the number of washings required to clean the cover after use.

A protective cover has been designed that addresses the foregoing requirements. The inventive protective cover fully darkens a space if an adult or child or pet is napping. Alternatively, it can be used to partially block the sun, rain or wind if the seated user prefers to flip (raise) and fasten one side panel of the cover upward. Additionally, the protective cover is useful to block the effects of motion on adults, children and pets who are prone to motion sensitivity, which lessens motion sickness. It also helps persons with other sensory issues by reducing outside stimuli while riding in a car, train, boat, plane or other moving conveyance. It also reduces or eliminates exposure to airborne contaminants. There are no products currently available for these multiple purposes.

The inventive protective cover is easy to attach and remove using simple securing mechanisms, such as magnets or Velcro in hook/loop configurations, straps, snaps, or combinations thereof. It does not require a supportive frame, and it is adaptable to a wide variety of seats in moving conveyances, such as a car, train, boat or plane, pushchair, stroller, buggy, carriage, jogging carts, and bike carts. It may be used in conjunction with child carriers, booster seats, car seats, pet seats, pet baskets, and other seating conveyances, particularly those used in moving vehicles or goods. The inventive protective cover is also adaptable in that it is available in multiple sizes but does not need to be replaced as a child grows. The inventive protective cover allows for quick and easy exit for an adult or older child without removing the cover from the seat and quick and easy access to a child or pet through a simple flip up or raising of the side panel without removing the cover. The side panels (flaps) of the cover may also provide a way to interact with others while traveling alone or with a child or pet, while still realizing the benefits of blocking and reducing exposure of the user to environmental elements, noise, motion effects, sensory stimuli and airborne contaminants.

It is an object of the invention to provide a protective cover for use with seated persons or pets in moving conveyances to reduce or block environmental effects, such as sun, rain and wind, motion effects, noise, sensory stimuli and airborne contaminants.

It is another object of the invention to provide a protective cover that creates a calm and restful environment for adults, children and pets while traveling in a moving conveyance.

Still another object of the invention is to provide a one-piece, easy-to-attach and remove protective cover that is adaptable to use with a variety of seating arrangements in moving conveyances through incorporation of various securing and attachment means designed into the cover.

Other objects of the invention will be evident to one skilled in the art based on the disclosure herein.

SUMMARY OF THE INVENTION

The invention is directed to an easy-to-attach and remove protective canopy-like cover or shield for use by a person or pet while seated in cars, trains, boats, airplanes, pushchairs, strollers, buggies, carriages, carts, or other moving conveyances or carriers, which protects adults, infants, children, and pets from the effects environmental elements (sun, rain wind), motion, noise, sensory stimuli and airborne contaminants.

The invention is a one-piece canopy-like cover with securing means on a top and bottom edge of the narrower diameter (semi-minor axis) of the cover, which may be used to secure the cover to a car, train, boat, or airplane seat through attaching means to headrests or other support structures in front of and behind the user when seated. The cover's attaching means may also be used with a pushchair, stroller, buggy, carriage, cart, carrier, or other moving conveyance by attaching the securing means to handles, footrests, foot bars, axels, wheels or wheelbases.

In one embodiment, the invention is a protective cover for use by a person or with a pet in a car, train, boat, plane or other moving conveyance, comprising:
 a. a fabric body that is substantially oval, having a semi-minor axis at a shorter diameter of the oval and a semi-major axis at a longer diameter of the oval body;
 b. two pairs of fabric-covered straps, each pair positioned on opposite sides of the semi-minor axis of the oval body;
 c. a multipurpose, deep pocket with elastic band top positioned on one side of the oval body positioned under one pair of fabric-covered straps;
 d. a mesh window or screen with a movable window cover positioned at a center of the oval body along the semi-minor axis and under the multipurpose deep pocket; and
 e. a plurality of securing means on each strap of the pair of straps, the movable cover of the mesh window, both sides of the semi-major axis, and at various locations on the oval body to allow various parts of the protective cover to attach to each other or a support structure of a moving conveyance,
 wherein the securing means are Velcro, straps, snaps, or magnets,
 wherein the protective cover is secured to seat in a car, train, plane or other moving conveyance through the pairs of fabric-covered straps positioned on opposite sides of the semi-minor axis of the oval body or through one set of straps and the multipurpose deep pocket, and
 wherein the attachment of the cover creates two side panels that may be left down or lifted up and fastened to the cover by securing means located on the side flaps and oval body of the cover.

In another embodiment, the protective cover of the invention is made with fabric or other materials that are treated, coated or otherwise have incorporated antimicrobial compositions or materials.

Still other embodiments will be evident to one skilled in the art based on the disclosure.

BRIEF DESCRIPTION OF THE DRAWINGS

The attached figures illustrate the invention and its various embodiments and uses.

FIG. 8 shows the protective cover with one side flipped back and attached to the body of the cover when used over a child car seat or booster seat. The same configuration is used for a person seated directly on the rear seat.

FIG. 9 shows the protective cover with the other side flipped back and attached to the body of the cover as used over a child car seat or booster seat. The same configuration is used for a person seated directly on the rear seat.

DETAILED DESCRIPTION OF THE INVENTION

Figure 1:
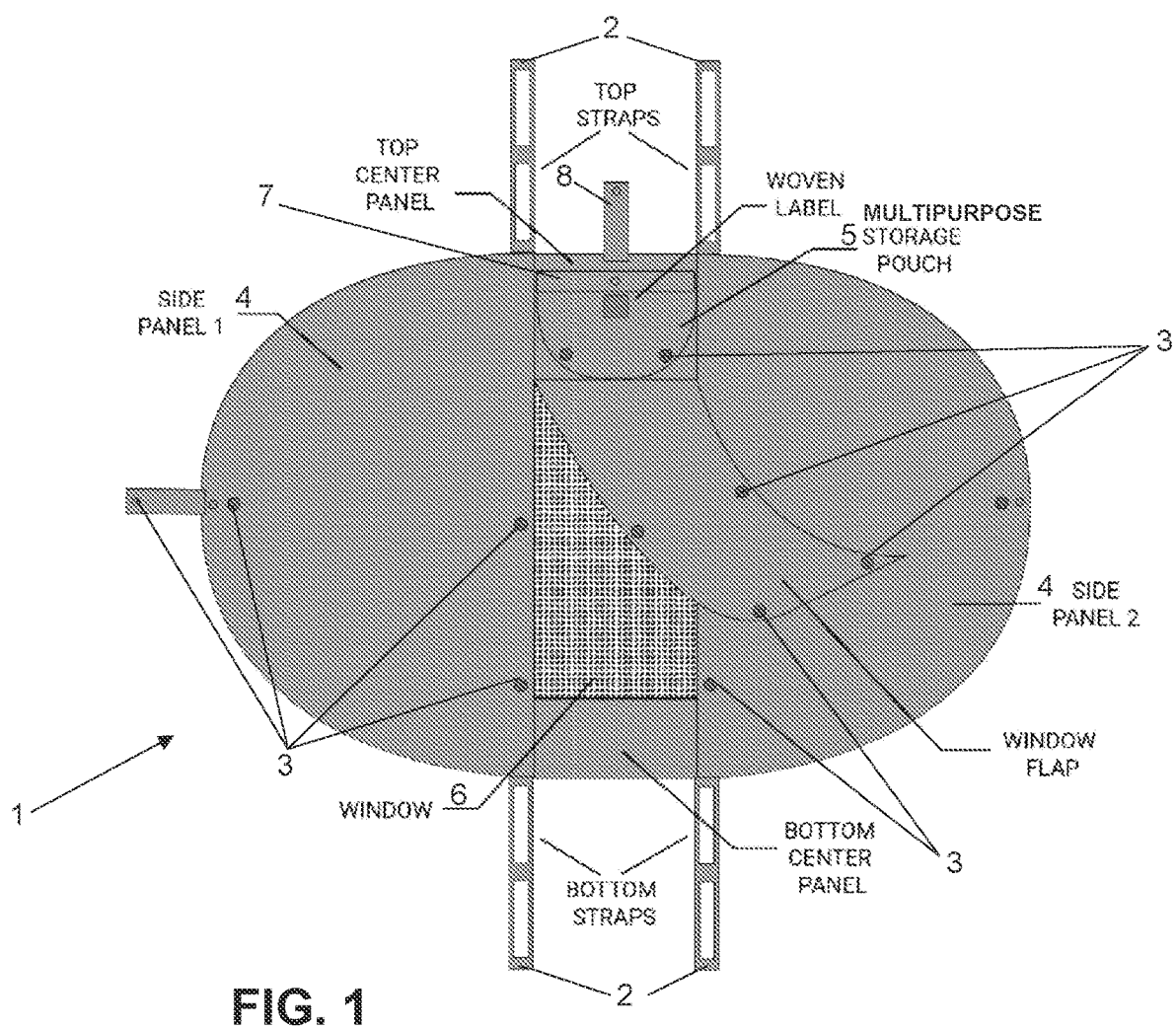
FIG. 1 is a view of the front (outward exposed side) of the protective cover, showing a multipurpose storage pouch (deep pocket) that may be used to store items, attach to a headrest or seat back, and store the cover when not in use; a mesh window; a window flap or cover to cover the mesh window for greater sensory reduction and protection; magnets or other securing means along the length of the mesh window and window flap and in the side panels to flip up and secure the window flap and side panels of the cover to other areas on the body of the cover; side strap for connecting the two sides of the cover around a seat in a moving conveyance, if needed; and a pair of top and bottom fabric covered attachment straps to attach the cover as required, depending on use.

The invention is directed to an easy-to-attach and remove protective canopy-, shield-, or fort-like cover for use by adults, children, and pets when seated in a car, train, boat, or plane seat, or in a seat of a pushchair, buggy, carriage, cart, carrier, or stroller, or other moving conveyance, to protect against or block the effects of environmental elements, such as wind, rain, and sun, motion, noise, sensory stimuli and environmental or airborne contaminants. The inventive protective cover is provided in a variety of sizes, all of which are one-piece, with securing means on a top and bottom edge of the semi-minor axis of the cover, which may be used to secure the cover to a headrest of a car, seat back or other support structure of a train, boat or plane seat, or handle, axel, footrest, foot bar, wheel or wheel base of a pushchair, carriage, buggy, cart, stroller or other moving conveyance used to transport a person or pet from place to place.

The inventive cover also provides a way for a user to exit a seat quickly or to access a child or pet without removing the cover from the seat or other moving conveyance by flipping or raising a side panel of the cover and fastening it to the body of the cover through attachment means. Either or both side panels of the cover may be raised and fastened to the body of the cover allowing the user to exit or interact with the environment.

The protective cover is intended for use in all types of moving conveyances that transport people or pets from place to place. For purposes of the invention, "conveyance" or "moving conveyance" includes without limitation transportation means for moving something or someone from one place to another. A moving conveyance includes without limitation a car or other motor vehicle, a train, a plane, a boat, a pushchair, buggy, carriage, jogging cart, bike cart, other carts, carriers, or strollers, all of which contain seats and are intended to transport a person or pet.

For purposes of the invention, "support structure" or "structural support component" includes without limitation a handle, axel, footrest, foot bar, other bar, wheel, wheelbase, seatback, headrest, and other components of a moving conveyance to which the protective cover may be attached when in use with a seated person or pet.

The inventive protective cover (1) is substantially oval in shape. Two sets (pairs) of fabric-covered straps (2) (attachment straps) are located on either side of the semi-minor axis (shorter diameter) of the oval for securing the cover to structural components of a moving conveyance, such as handle, wheel, axel, footrest, or bar of a pushchair, buggy, carriage, cart, or stroller, or a headrest, seatback, spindle or other support structure on a seat in a car, train or plane. The straps within each set are positioned in close proximity to each other but are not required to be right next to each other. Preferably, each strap within the pair is spaced at least six inches from the other strap to allow the straps to be joined or fastened to each other around structural support component of the moving conveyance as described above to secure or attach the protective cover in place. Alternatively, each strap may be used individually to attach the protective cover to a structural support of a moving conveyance. The fabric covered attachment straps may also include elastic bands for more flexibility.

Figure 13:
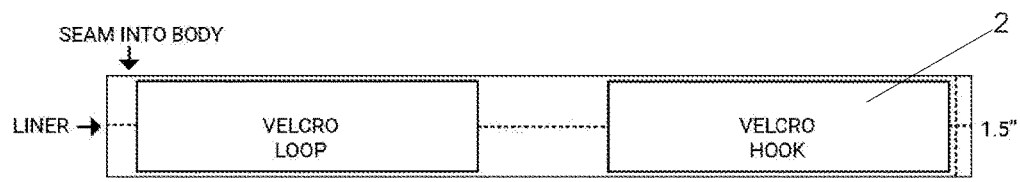
FIG. 13 shows the orientation of the Velcro hook/loop arrangement on one strap of the pair of straps.
Figure 14:
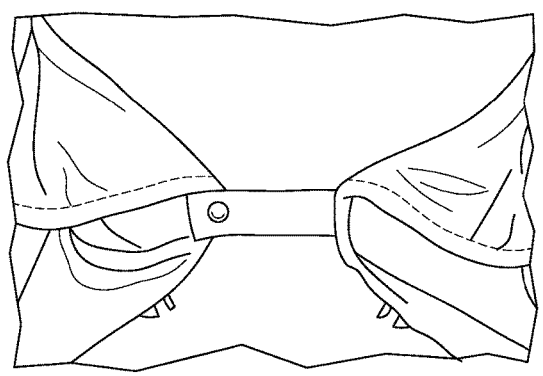
FIG. 14 shows the side panels of the cover connected behind the seat of a moving conveyance.

Each strap of the pair of attachment straps has two pieces of Velcro arranged vertically on the strap (FIGS. 1 and 13)—one piece a hook and the other a loop configuration—to allow attachment of the strap individually (to itself) around a structural support component of a moving conveyance or to each other. Within each set of straps, the hooks and loops of the Velcro are positioned on the opposite side of each strap so that the straps of the set may be connected to each other. The Velcro hook/loop configuration of each strap in the set (pair) of straps (2) allows for smooth connection (attachment) of the strap to itself or the straps to each other when securing the cover to a moving conveyance or car, train or plane seat, through the Velcro pieces. The configuration also provides a means to adjust the tension of the attachment when interlocking different orientations (hook/loop) of the pieces of Velcro on each strap.

On each side, end and various parts of the semi-major axis of the oval are other securing means, including magnets, Velcro, snaps and straps, or combinations thereof (3) to allow a side panel (4) of the cover to be flipped, raised, moved or lifted upward and secured to other magnets, Velcro, snaps, straps, or other securing means on the body of the protective cover. The Velcro, magnet, straps, snaps or other securing means can be used in combination to achieve the cover configuration desired. All securing means can be undone with a gentle pull for easy release.

Magnets, when used, may be located in seam in the cover or attached to the cover by other means. The polarity of the magnets is arranged so that there are multiple connections (negative/positive polarity) that can be made when the side panels (4) are flipped upward for attachment to the cover. In a preferred embodiment, securing means on the edges of both sides of the semi-major axis are magnets positioned in seam, wherein the side panels are fastened in an upward position by connecting the magnets on the edge of the side panels to magnets positioned on the body of the cover.

Alternatively, the securing means on edges of both sides of the semi-major axis are Velcro pieces positioned at an edge of the side panel (4), wherein the side panels are fastened in an upward position by connecting the Velcro pieces positioned at the edge of the side panels (flaps) to Velcro pieces positioned on the body of the cover.

The cover also comprises a multipurpose, deep pocket with elastic band (5) on one side of the oval shaped cover positioned on the semi-minor axis, at or below the position of the top set of straps and above the mesh window (6) (FIG.

Figure 4:
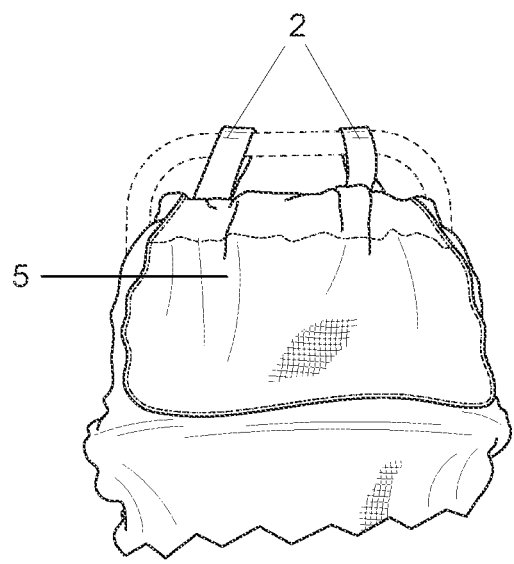
FIG. 4 shows the top front of the protective cover when attached with the top pair of straps to the handle of a pushchair and showing an exploded view of the multipurpose storage pouch.
Figure 5:
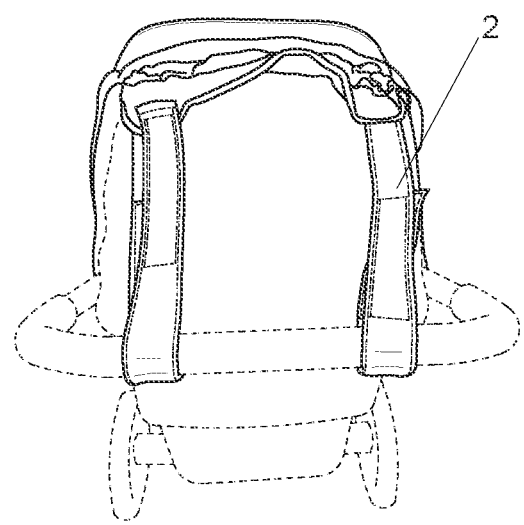
FIG. 5 shows the top rear view of the protective cover showing an exploded view of the top pair of attachment straps attached to the pushchair handle.
Figure 10:
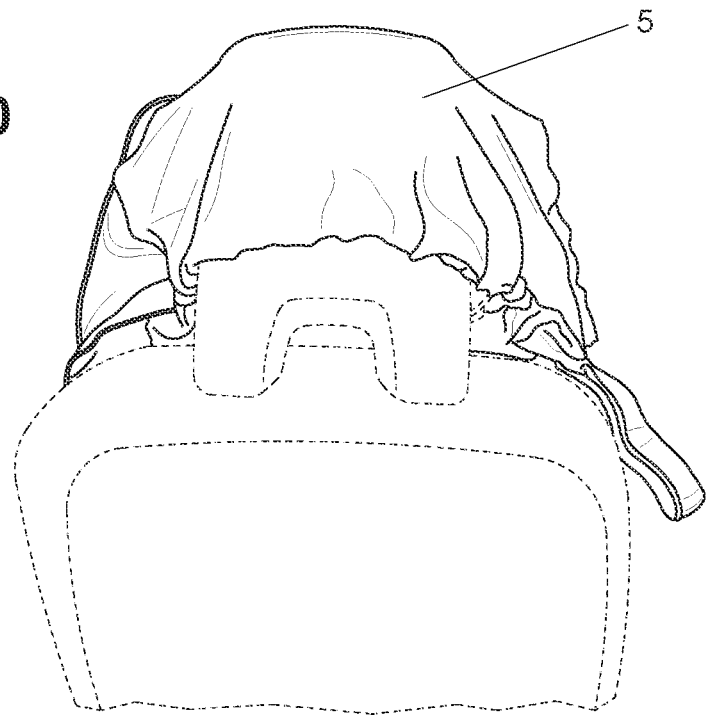
FIG. 10 shows the top of the protective cover attached to the headrest of a rear seat in car by slipping the multipurpose storage pouch with elastic band over the headrest of a rear seat, which may also be used to attach the protective cover to a seatback of a train or airplane seat.
Figure 12A:
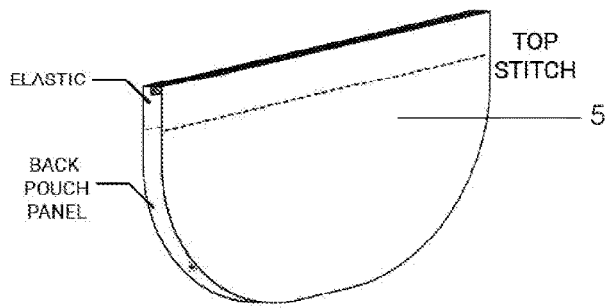
FIG. 12a shows the front of the multipurpose storage pouch with elastic band and male snap for connecting to a small strap on the cover placed in between the top pair of straps.
Figure 12B:
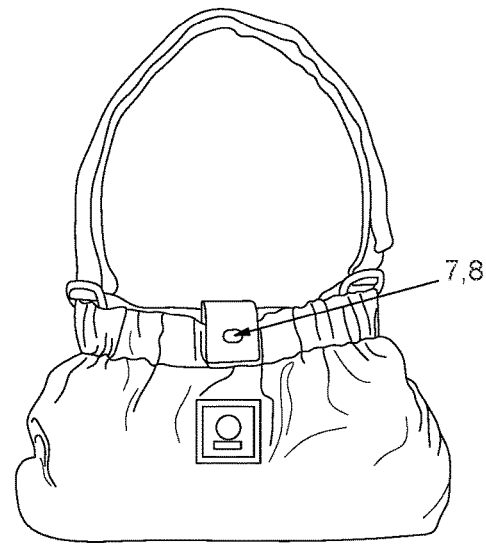
FIG. 12b shows the multipurpose storage pouch in a purse or bag-like configuration to hold and transport the protective cover when not in use.

1), typically the "top" of the cover. This deep pocket provides a storage pocket when used on a moving conveyance (FIG. 4), such as a pushchair, carriage, buggy, cart, or stroller and also provides a means to attach the cover to the headrest of a rear car seat when the cover is used in a car (FIGS. 8, 9 and 10). A preferred attachment in a car is to secure the deep pocket over the corresponding rear headrest (FIG. 10) so that the cover is positioned higher near the user's head and lower for the driver's line of vision to the rear window. The multipurpose deep pocket is also a purse-like storage pouch for the cover when not in use (FIG. 12*b*). The multipurpose deep pocket has a male snap (7) positioned on the elastic band (FIG. 1 and FIG. 12*b*) to close the pouch during storage by connecting to a small strap having a female snap (8) located between the top set of the fabric covered attachment straps, which connection facilitates securing the multipurpose deep pocket (5) to a headrest or seatback so that it is not easily moved or pulled off.

The protective cover also includes a mesh window (6) positioned at approximately the center of the oval on the semi-minor axis of the cover to allow a user to look out and/or communicate with others or provide additional ventilation or airflow. The mesh window has a flip up cover (9) (window cover) that may be folded, rolled or raised and secured with magnets or Velcro when in use. Or, for greater privacy, sensory reduction and protection, the flip-up cover may be left closed.

Figure 3:
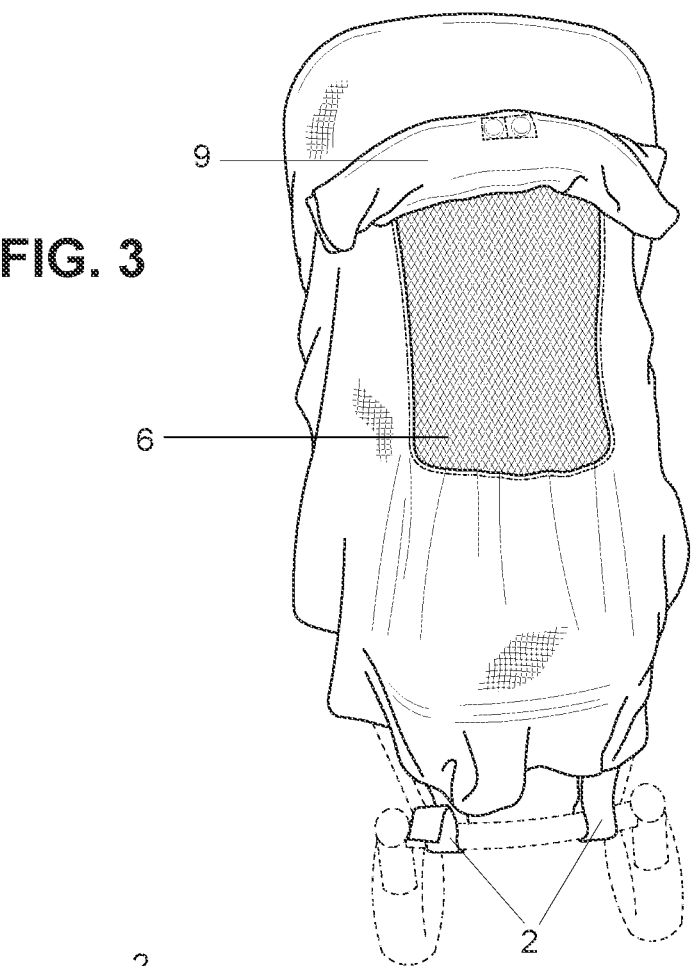
FIG. 3 shows the protective cover attached to a pushchair, with window flap rolled up and attached to the cover exposing the mesh window and the bottom pair of attachment straps on the wheel axel having two front wheels.
Figure 6:
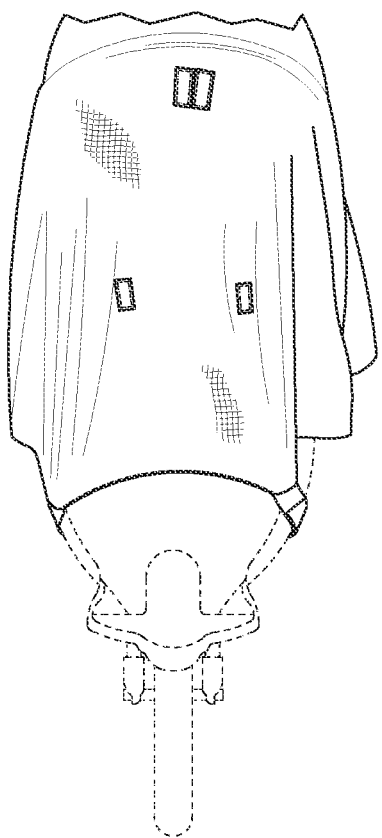
FIG. 6 is a bottom front view of the cover showing an exploded view of the bottom pair of attachment straps secured around the base of a pushchair having one front wheel.
Figure 7:
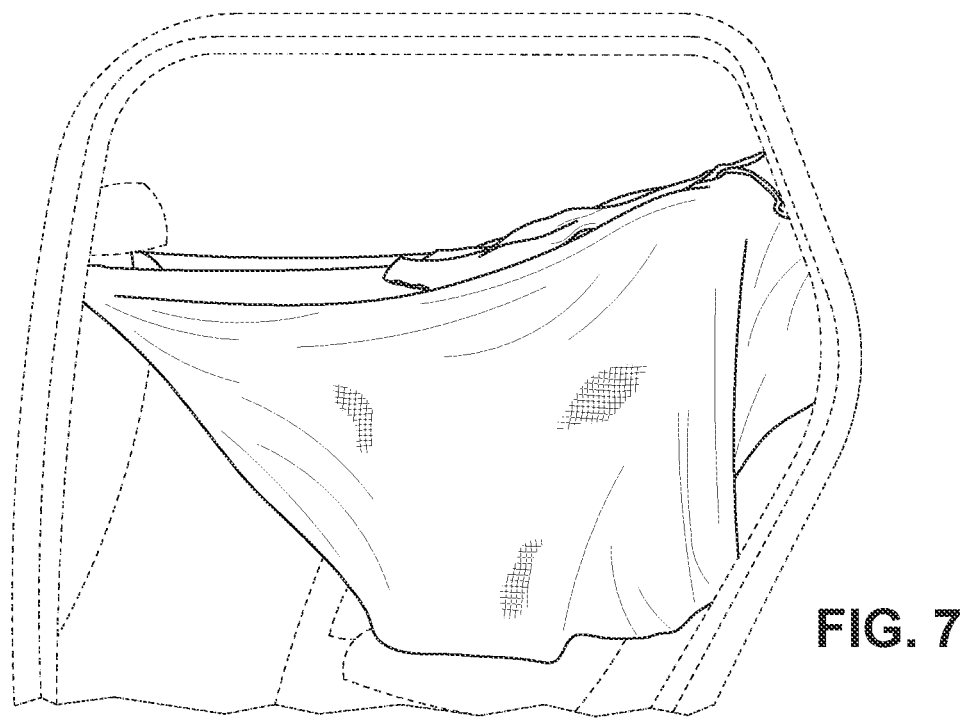
FIG. 7 shows the protective cover attached to a front and rear head rest when used in a car to cover a passenger in a rear seat. The same configuration can be used for train or plane seats.

When used with a moving conveyance such as a pushchair, buggy, carriage, stroller or cart, the cover attaches to the handles and the wheel, wheel axel, footrest or lower foot bar near the wheels through the two sets of straps at the bottom of the cover. As described above, a strap within each set may attach individually to a handle, bar or other support structure on the conveyance, or the straps may connect to each other directly, depending on the moving conveyance being covered. For a one-wheel moving conveyance, the straps of each set may be attached to each other. (FIG. 3). For a two-wheel moving conveyance, the straps may be used individually to attach the cover to the wheels, wheel axel, footrest or foot bar near the wheels or bottom of the conveyance. (FIG. 6).

Figure 11:
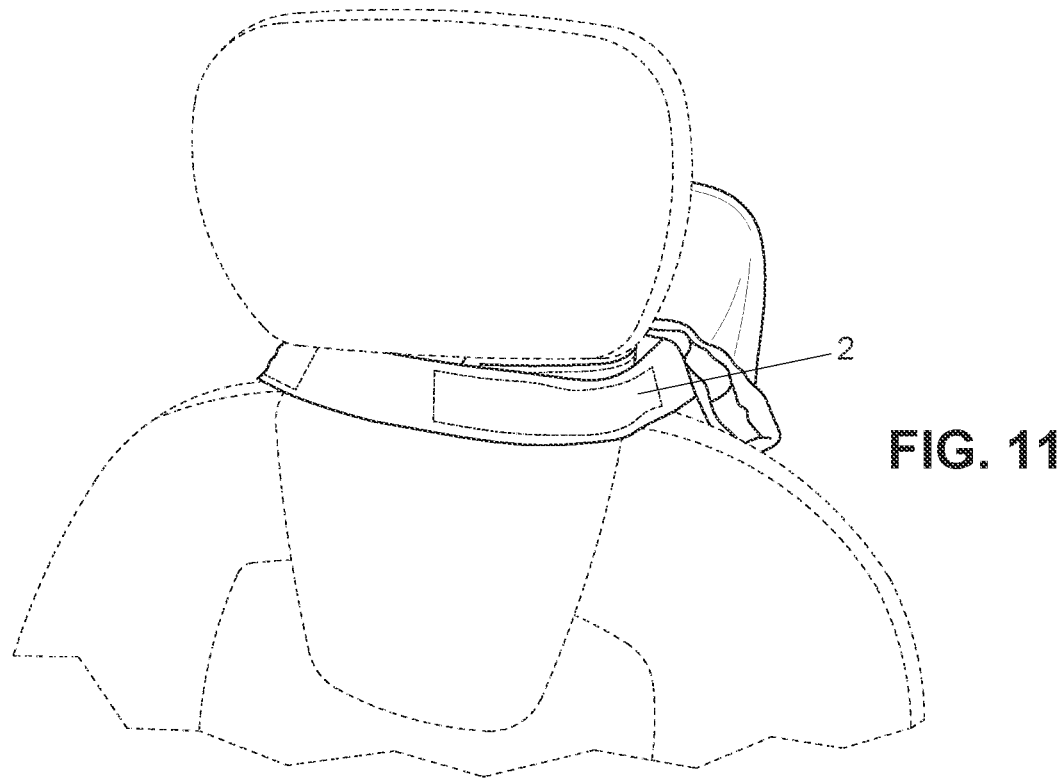
FIG. 11 shows the bottom of the protective cover attached to a headrest of the front seat of a car in front of the user by connecting the bottom pair of straps.

In a car, the cover is attached to the headrest, seatback or other support structure of a front seat in front of the user (FIG. 11) and a headrest, seatback or other support structure of a rear seat through the set of straps on each end of the cover, or through one set of straps attached to the support structures on the front seat of the car and the above-noted deep pocket with elastic band attached to a support structure on the rear seat. (FIG. 10). The unique and novel strap design comprises "reversed" hook/loop orientations of the Velcro positioned on opposite straps of the set, meaning the hook portion of one strap is aligned with a corresponding loop portion on the other strap of the set. This configuration allows both straps of the set to fasten around the bottom of the headrest or other support structure of the front seat by making a loop of the interlocked straps that fully circles the headrest. Alternatively, each strap individually may be used to attach around spindles or support structures of a front seat headrest. For the rear seat attachment, preferably, the multipurpose deep pocket with elastic band is slipped over the rear headrest or seatback and the small strap with female snap on the cover connects to the male snap on the elastic band of the multipurpose deep pocket to hold the pocket into place. Alternatively, depending on the size and space in the particular car or vehicle or other moving conveyance, the opposite set of attachment straps are fastened to the adjacent rear seat's headrest or other support structure of the rear seat in the same manner as the attachment of the cover to the front seat headrest. Similar attachment configurations may be used when traveling on a train, boat or airplane. The cover is easily attached through its sets of straps, or through one set of straps and the multipurpose deep pocket to a headrest, seatback or other support structures in front of the user and on the user's seat.

The cover functions as a protective device for the user. Its "fort like" design makes it particularly appealing to young children. The protective cover blocks the environmental elements, such as sun, rain and wind, dampens noise, reduces the sensation of movement and hence motion sickness, reduces sensory stimuli, reduces or eliminates exposure to airborne contaminants, and creates a barrier between other people and the user. The unique cover design in use creates side panels (small wings or flaps) on each side that may be flipped, moved, raised or lifted down and up, together, or separately. The side panels (4) can be rolled or folded up and attached to the body of the cover with Velcro or magnets or other securing means (3) in a variety of configurations, creating an opening on either side or both sides depending on the desired or required blocking.

In addition to adult use, the protective cover is suitable and desirable for use with children and young adults. Parents can easily peek at their child by keeping one side panel up while traveling or driving or by securing the side panels according to their liking when used on other moving conveyances. The protective cover can be arranged to have both side panels left down (closed) or one or both side panels open by lifting the panel, folding or rolling it, and fastening it through magnets or other securing means to the body of the cover in various ways. The ability to move the side panels allows easy exit and quick access to a child or pet without having to remove the cover from the seat of the moving conveyance.

The inventive protective cover is a safe and comfortable cover designed for use by adults and children while traveling in a car, train, plane or other moving conveyance. It may also be used for pets to cover pet carts, pet baskets or pet seats in a car to protect the pet and reduce the effects and influence of external stimulants. The main functions of the protective cover are to block all forms of sensory stimuli and environmental elements, reduce noise, reduce or eliminate exposure to airborne contaminants, and create a dark cozy space for users when rest is desired or needed. In use, the cover creates a fort-like or shield-like appearance pleasing to children and young adults. A darkened space is particularly useful with children as it allows a restful environment for children to nap and parents to drive or travel long distances with less stress from overly tired children. The cover facilitates privacy for the user, keeps children and pets sheltered away from the happenings around them and discourages other persons from interacting with the user.

The inventive protective cover preferably is made out of cotton/spandex blend material and the window/vent of utility mesh, such as that used for a window screen. It is substantially oval in shape (FIG. 1). The inventive cover may be sized to fit the person and most types of cars, SUV's, and other moving conveyances, such as pushchairs, carts, buggies, carriages and strollers. The window flap or window cover over the mesh window is the same cotton/spandex blend used for the body of the cover. In one embodiment, the materials used to make the protective cover may be treated or coated with, or otherwise have incorporated, antimicrobial materials or fibers to provide additional protection from airborne contaminants and to reduce the organic load on the exterior of the cover when used. Use of antimicrobial materials may reduce the number of washings required to clean the cover after use.

The unique cover design has a wide variety of uses and is highly adaptable to the user's circumstances. It may be used in a car, train, plane, and with other moving conveyances, including without limitation a pushchair, buggy, carriage, stroller or other type of cart, such as a jogging or bike cart. There is no need to have two different types of covers or shields to achieve blocking or reduction of exposure to sun, wind, rain, noise, motion, sensory stimuli, or airborne contaminants or to isolate an adult, child or pet from others. When leaving the car, train, boat, plane, or other moving conveyance, the cover is easily detached and may be stored in the multi-purpose deep pocket or then attached to another moving conveyance.

When used with a pushchair, stroller, buggy or carriage, the protective cover may be used in conjunction with awnings, or it can be used alone to create a cozy, safe restful environment and reduce exposure of a child to environmental elements, sensory stimuli or airborne contaminants. The flaps or side panels created by attaching the cover with both sets of the attachment straps can be left down or secured for fuller coverage by pulling each side around and behind the seating area and securing the side panels together with straps, snaps, Velcro, magnets, or other securing mechanisms. As in a car, train, boat or plane, the same options exist to block only one side of the particular moving conveyance from environmental elements, such as the sun, rain, or wind, sensory stimuli, motion effects or airborne contaminants, by lifting up either or both side panels and using Velcro or magnets to attach the side to the top or body of the cover.

Figure 2:
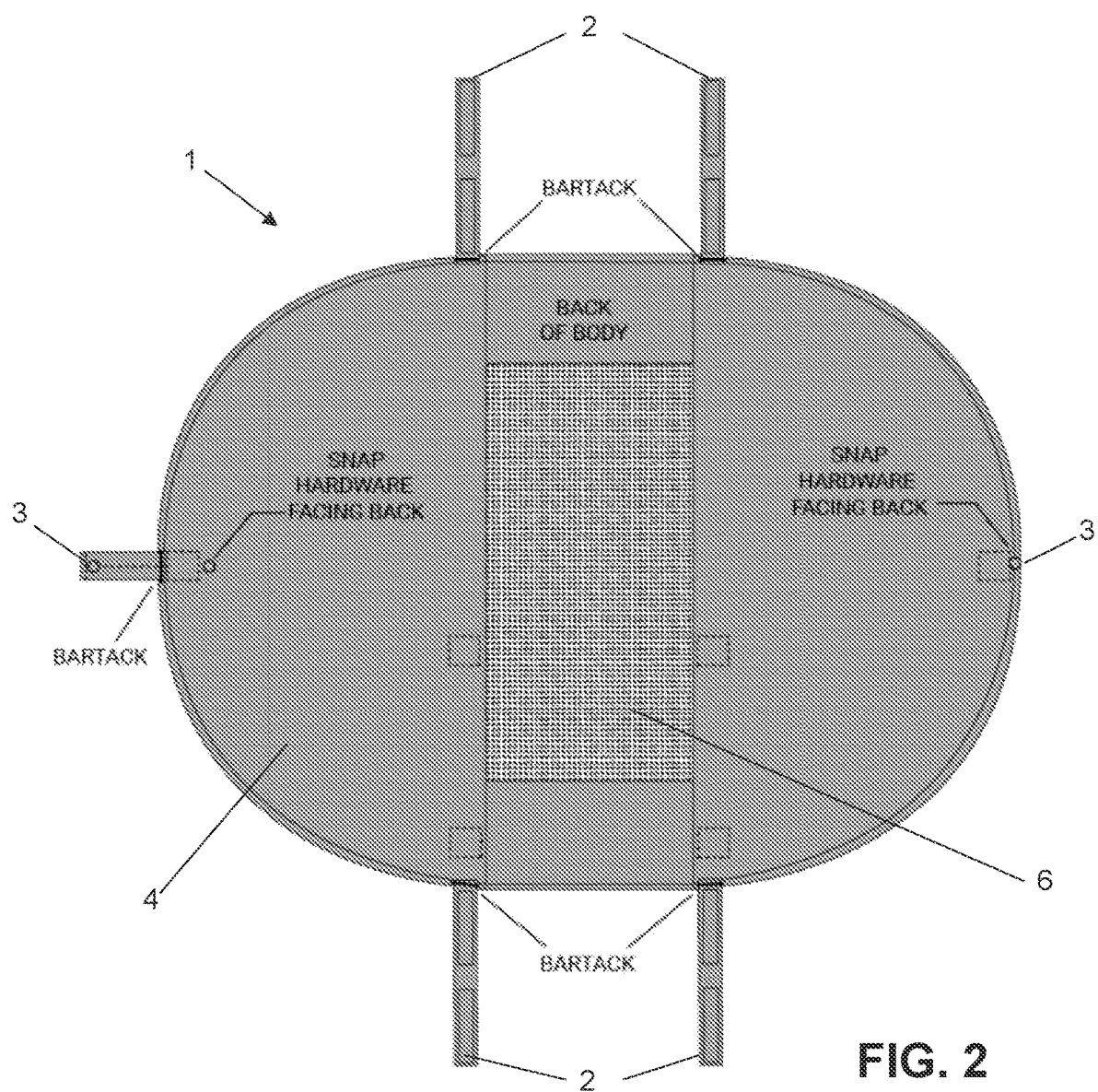
FIG. 2 is a view of the back (inward non-exposed side) of the protective cover, showing placement of the side strap and securing/attachment means to connect the two sides of the cover in use.

The invention is further described by the preferred embodiment as shown in FIGS. 1 and 2.

Preferred Embodiment Research.

The unique protective cover was initially designed to block the sun for children in a car so they can sleep. However, based on in field use and research, it achieved a variety of functions for adults, children and pets, as follows:
1. Blocked sun so the user could fall asleep more easily.
2. Blocked out sensation of movement for adults, children or pets with motion sensitivity issues and thus reduced motion sickness.
3. Reduced interactions between children and/or pets and other people or pets and limited distractions to parents while driving.
4. Prevented motion sickness.
5. Insulated seats from the sun when away from a car.
6. Had a calming and restful effect.
7. Prevented sunburn, particularly when used on moving conveyance with a child.
8. Blocked out triggers and sensory issues for children with special needs.
9. Attracted and facilitated use by children who love and enjoy forts as their own personal space.
10. Reduced or eliminated exposure to airborne contaminants in crowded spaces.

What is claimed is:

1. A protective cover, for use by a person or with a pet in a car, train, boat, plane, stroller, buggy, pushchair, or cart, all of which contains seats and are used to transport a person or pet from place to place, comprising:
   a. a one-piece, fabric body that is substantially oval, having a semi-minor axis at a shorter diameter of the oval and a semi-major axis at a longer diameter of the oval body;
   b. two pairs of fabric-covered straps, each pair positioned on opposite sides of the semi-minor axis of the oval body;
   c. a multipurpose, deep pocket with an elastic band top edge positioned on one side of the oval body positioned under one pair of the fabric-covered straps;
   d. a mesh window or screen with a movable window cover positioned at a center of the oval body along the semi-minor axis and under the multipurpose deep pocket; and
   e. a plurality of securing means on each strap of the two pairs of fabric-covered straps, the movable cover of the mesh window, edges of both sides of the cover on the semi-major axis, and at various locations on the oval body to allow various parts of the protective cover to attach to each other or a support structure of a moving conveyance,
   wherein the securing means are hook and loop fasteners, straps, snaps, or magnets,
   wherein the protective cover is secured to a seat in a car, train, boat, plane, stroller, buggy, pushchair, or cart, all of which contain seats and are used to transport a person or pet from place to place, through the pairs of fabric-covered straps positioned on opposite sides of the semi-minor axis of the oval body or through one set of straps and the multipurpose deep pocket,
   wherein the attachment of the cover creates two side panels on the semi-major axis that may be left down or lifted up and fastened to the cover by securing means located on the side panels and oval body of the cover,
   wherein the securing means on each strap of the two pairs of fabric-covered straps comprises at least two pieces of hook and loop configured fasteners, and wherein on each strap within the two pairs of fabric-covered straps the hook and loop configured fasteners are placed on opposite sides of each strap,
   wherein the securing means for the movable cover of the mesh window are hook and loop fasteners or magnets, and
   wherein the securing means on edges of both sides of the semi-major axis are magnets positioned in a seam at an edge of the side panels and wherein the side panels are fastened in an upward position by connecting the magnets positioned on the edge of the side panels to magnets positioned on the body of the cover.

2. A protective cover for use by a person or with a pet in a car, train, boat, plane, stroller, buggy, pushchair, or cart, all of which contains seats and are used to transport a person or pet from place to place, comprising:
   a. a one-piece, fabric body that is substantially oval, having a semi-minor axis at a shorter diameter of the oval body and a semi-major axis at a longer diameter of the oval body;
   b. two pairs of fabric-covered straps, each pair positioned on opposite sides of the semi-minor axis of the oval body;
   c. a multipurpose, deep pocket with an elastic band top edge positioned n one side of the oval body positioned under one pair of the fabric-covered straps;
   d. a mesh window or screen with a movable window cover positioned at a center of the oval body along the semi-minor axis and under the multipurpose deep pocket; and
   e. a plurality of securing means on each strap of the two pairs of fabric-covered straps, the movable cover of the mesh window, edges of both sides of the cover on the semi-major axis, and at various locations on the oval body to allow various parts of the protective cover to attach to each other or a support structure of a moving conveyance, wherein the securing means are hook and loop fasteners, straps, snaps, or magnets, wherein the protective cover is secured to a seat in a car, train, boat, plane, stroller, buggy, pushchair, or cart, all of which contain seats and are used to transport a person or pet from place to place, through the pairs of fabric-covered straps positioned n opposite sides of the semi-minor axis of the oval body or through one set of straps and the multipurpose deep pocket, wherein the attachment of the cover creates two side panels on the semi-major axis that may be left down or lifted up and fastened to the cover by securing means located on edges of the two side panels and on the oval body of the cover, wherein the securing means on the edges of the two side panels and on the oval body of the cover are magnets positioned in a seam at the edge of the side panels and on the oval body of the cover, and wherein the side panels are fastened in an upward position by connecting the magnets positioned in the seam at the edge of the side panels to magnets positioned on the oval body of the cover.

* * * * *